US008176943B2

(12) United States Patent
Stroempl et al.

(10) Patent No.: US 8,176,943 B2
(45) Date of Patent: May 15, 2012

(54) HIGH TEMPERATURE FIRE SLEEVE

(75) Inventors: Peter J. Stroempl, Fort Worth, TX (US); Nagarajan Ramaswamy, Fort Worth, TX (US)

(73) Assignee: Parker-Hannifin Corporation, Cleveland, OH (US)

( * ) Notice: Subject to any disclaimer, the term of this patent is extended or adjusted under 35 U.S.C. 154(b) by 373 days.

(21) Appl. No.: 12/578,079

(22) Filed: Oct. 13, 2009

(65) Prior Publication Data
US 2010/0126617 A1 May 27, 2010

Related U.S. Application Data

(60) Provisional application No. 61/116,649, filed on Nov. 21, 2008.

(51) Int. Cl.
*F16L 11/00* (2006.01)

(52) U.S. Cl. ........ 138/137; 138/138; 138/149; 138/143; 138/133

(58) Field of Classification Search .................. 138/149, 138/137, 141, DIG. 3, DIG. 9
See application file for complete search history.

(56) References Cited

U.S. PATENT DOCUMENTS

| | | | | |
|---|---|---|---|---|
| 1,630,895 A | * | 5/1927 | Herbst | 285/222.4 |
| 3,251,612 A | | 5/1966 | Webbe | 285/47 |
| 3,540,488 A | | 11/1970 | Voorhees | 83/471.1 |
| 3,552,445 A | * | 1/1971 | Andrews | 138/144 |
| 3,913,625 A | | 10/1975 | Gazda et al. | 138/140 |
| 4,159,027 A | * | 6/1979 | Caillet | 138/127 |
| 4,271,218 A | * | 6/1981 | Heckel et al. | 138/141 |
| 4,275,769 A | | 6/1981 | Cooke | 138/109 |
| 4,307,756 A | * | 12/1981 | Voigt et al. | 138/149 |
| 4,509,559 A | | 4/1985 | Cheetham et al. | 138/121 |
| 4,942,903 A | | 7/1990 | Jacobsen | 138/110 |
| 5,489,126 A | * | 2/1996 | Gray, Jr. | 285/93 |
| 5,638,869 A | * | 6/1997 | Zaborszki et al. | 138/109 |
| 5,988,226 A | | 11/1999 | Matthews | 138/109 |
| 6,334,466 B1 | * | 1/2002 | Jani et al. | 138/141 |
| 6,494,497 B1 | | 12/2002 | Kertesz | 285/226 |
| 2006/0151043 A1 | | 7/2006 | Nanney et al. | 138/125 |
| 2006/0201570 A1 | | 9/2006 | Lord et al. | 138/137 |
| 2008/0185063 A1 | * | 8/2008 | Bieszczad et al. | 138/126 |

FOREIGN PATENT DOCUMENTS

| | | | |
|---|---|---|---|
| GB | 2 184 512 A | | 6/1987 |
| JP | 2004197915 A | * | 7/2004 |
| WO | 99/11962 | | 3/1999 |
| WO | 2004/048086 | | 6/2004 |

OTHER PUBLICATIONS

International Search Report and the Written Opinion for corresponding International Application No. PCT/US2010/042216 mailed Oct. 12, 2010.
International Preliminary Report on Patentability for copending International Application No. PCT/US2010/042216 mailed Oct. 14, 2011.

* cited by examiner

*Primary Examiner* — Patrick F Brinson
(74) *Attorney, Agent, or Firm* — Renner, Otto, Boisselle & Sklar, LLP

(57) ABSTRACT

A flexible hose for conveying fluids and suitable for high temperature environments, the hose comprising a core tube, a thermal insulating layer surrounding the core tube, a metal layer surrounding the thermal insulating layer, and a vented jacket surrounding the cover layer. The thermal insulating layer may be a fibrous material such as a silica fiber. The metal layer may also be a chemical resistant layer and be thermally stable up to at least about 550° F. The vented jacket may be a wire braid having interstices therein and formed from a corrosion resistant material.

12 Claims, 4 Drawing Sheets

HIGH TEMPERATURE FIRE SLEEVE

CROSS-REFERENCE TO RELATED APPLICATIONS

The present application claims the benefit of the filing date of U.S. Provisional Application Ser. No. 61/116,649, filed Nov. 21, 2008.

TECHNICAL FIELD

The present invention relates to flexible hoses and particularly, flexible hoses suitable for use in high temperature environments, such as, for example, high performance aircraft and within high ambient temperature environment locations or engines.

BACKGROUND

Flexible hydraulic and pneumatic hose assemblies have been used in a variety of fluid transfer applications including, for example, in aircraft engines. Hose assemblies for various applications must often be able to sustain high pressures over relatively long periods of time. It is also desirable for such hoses to have good abrasion resistance, low leakage of fluids, good mechanical strength, low permeability to moisture and/or vapors, good strength to weight ratio, good corrosion resistance, suitable flexibility, and the like.

In some environments, such as in aircraft or aerospace applications, hoses may be subjected to high temperatures. For example, hoses may be utilized in areas where there may be a danger of fire. Thus, a hose assembly may require fire resistant protection to withstand the high temperatures encountered in a fire to minimize the likelihood of fire or high temperatures damaging the hose. FAA standards require certain devices to withstand the heat of a burning aircraft for a period of fifteen minutes before exposing the enclosed devices to fire. For example, a fuel hose must not release fuel into a fire for the initial fifteen minutes of burning. Under the current standards after fifteen minutes have elapsed, it is no longer necessary to prevent the flame from reaching the covered device.

Hoses having fire resistant properties are known in the art. For example, it is known to encompass the hose and portions of the associated hose fittings with a fireguard or firesleeve. The firesleeve often consists of a silicone rubber tube surrounding the hose and/or fitting. Silicon rubber firesleeves, however, may ablate when subjected to fire. Silicon rubber firesleeves also do not protect the hose from oil, fuel, or chemical attack, and also do not provide resistance to chafing. In some instances, a metal tube has been provided as an outer layer of a firesleeve surrounding an insulating layer such as a silicone layer. At temperatures above 450° F., such protective covers may only provide suitable protection for a relatively short period of time. In particular, silicon rubber firesleeves tend to dry, shrink, and crack when exposed to extremely high temperatures for extended periods of time, and may fail at around 14,000 hours.

The ability of a hose to withstand high temperatures for a given period of time may also be affected by the fluid flow through the hose. In the past, maintaining a fluid flow in the hose (such as from the fluid being transferred through the hose) was desirable to keep the underlying hose cool during a fire. The fluids being transferred through the hose, however, are typically flammable. Thus, a hose failure could result in flammable fluids coming in contact with the fire, which may feed or intensify the fire. Consequently, there has been a trend in the aircraft industry to build engines in which the flow through hoses may be reduced or stopped in the event of a fire.

SUMMARY

The present invention provides a flexible hose for use in high temperature environments. In particular, the present invention provides a flexible hose that has a high resistance to temperature degradation and may be capable of operating at elevated temperatures such as 450° F. or higher. In one embodiment, the hose may be capable of operating at temperatures of about 600° F. or higher and, in another embodiment, at temperatures of about 860° F. or higher. A hose in accordance with the present invention may be capable of operating at elevated temperatures for extended periods of time while maintaining its mechanical and structural integrity. Protection against high temperatures, which may be experienced during a fire, may be provided by an insulating layer surrounding a core tube. High temperature performance may also be provided by a cover layer surrounding the insulating layer and a vented jacket surrounding the cover layer.

Accordingly, the present invention provides, in one aspect, a flexible hose for high temperature environments comprising a core tube; an insulating layer surrounding the core tube; a chemical resistant layer surrounding the insulating layer, the chemical resistant layer comprising a metal layer; and a vented jacket surrounding the first cover layer.

The insulating layer may be a fibrous material such as, for example, a silica fiber, a fiberglass, a ceramic fiber, and the like.

The vented jacket may comprise a corrosion resistant material. The corrosion resistant material may be a stainless steel or a nickel alloy. The corrosion resistant steel may be resistant to the formation of chromium carbides when exposed to very high temperatures.

The vented jacket may be a wire braid having interstices therein.

The vented jacket may be a corrugated tube comprising at least one vent hole in a wall thereof.

The chemical resistant layer serves as a barrier to liquids and/or provides some level of abrasion or scuff resistance. Additionally, the chemical resistant layer may be thermally stable at temperatures up to at least about 450° F., and may be thermally stable at temperatures up to at least about 860° F. In one embodiment, the chemical resistant layer comprises a metal layer. The metal layer may be provided as a metal foil or may be a metal film deposited on the insulating layer. In one embodiment, the metal layer comprises aluminum. In another embodiment, the metal layer comprises stainless steel.

The insulating layer may be non-ablative at least when the hose is subjected to a fire at 2000° F. for a period of fifteen minutes.

The hose may be fireproof or fire resistant as defined in SAE AS 1055. The hose may be fire resistant, fireproof, or both under conditions in which the hose experiences a fluid flow similar to fluid flow rates under standard operating conditions, a low flow rate (e.g., $5 \times ID^2$ or $1 \times ID^2$), or a fluid flow rate of about zero gallons per minute.

A hose according to the present invention may also comprise a core tube formed from a PTFE material; an insulation layer surrounding the core tube, the insulation layer comprising silica fiber; a metal layer surrounding the thermal insulation layer; and a corrosion resistant braid surrounding the metal layer.

These and other features of the invention are further described with reference to the following detailed description in conjunction with the drawings.

DETAILED DESCRIPTION

A hose in accordance with the invention may find use in a variety of hydraulic or other fluid transfer applications. In one embodiment, a hose in accordance with the invention is particularly suitable for use in aircraft including high performance aircraft. In one embodiment, the hose is capable of operating at elevated temperatures, such as about 450° F. or higher, and may be capable of operating at temperatures of about 860° F. or higher.

Figure 1:
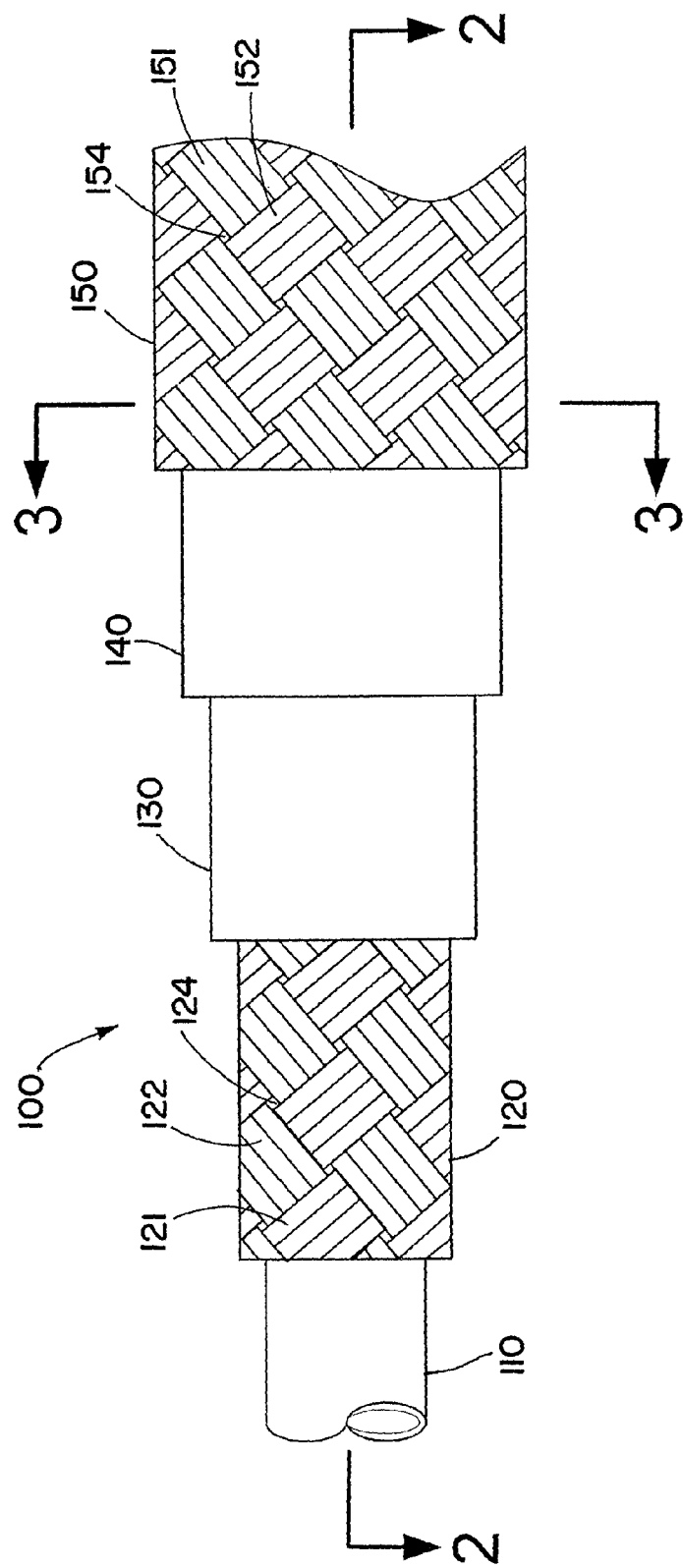
FIG. 1 is a side-elevational cutaway view of a hose in accordance with one embodiment of the present invention.
Figure 2:
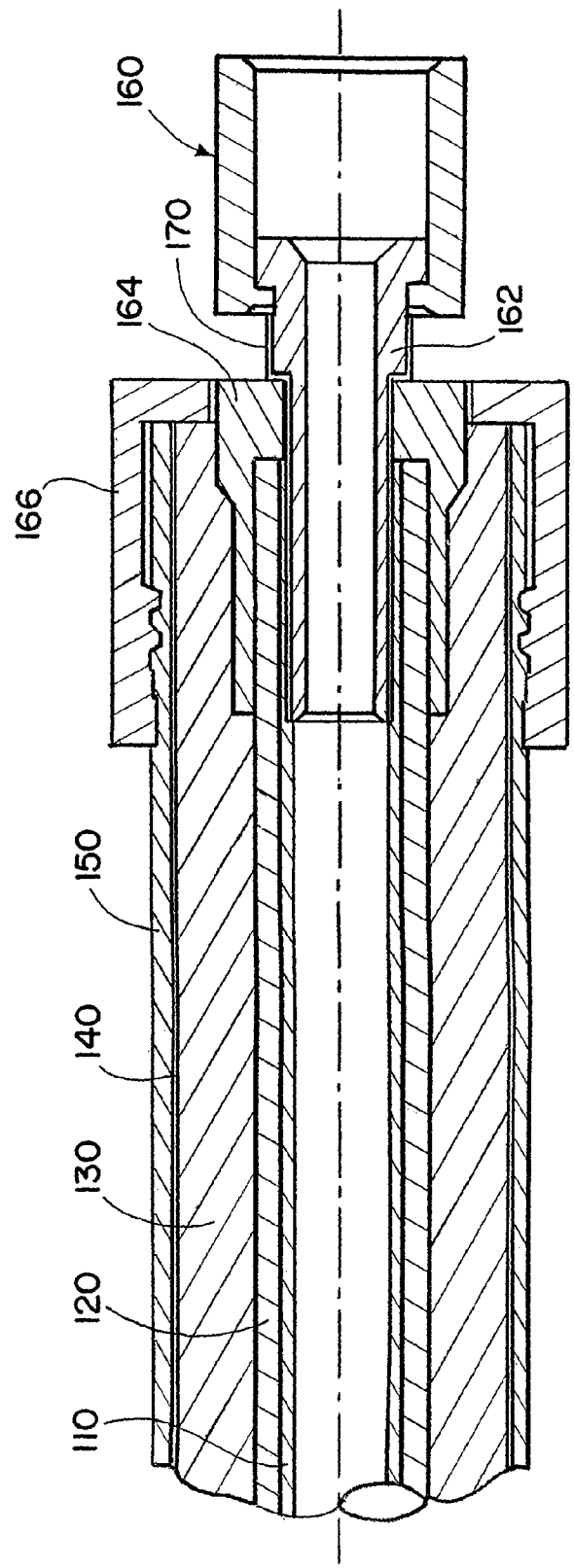
FIG. 2 is a cross-sectional view of the assembled hose in FIG. 1 taken along the line 2-2.
Figure 3:
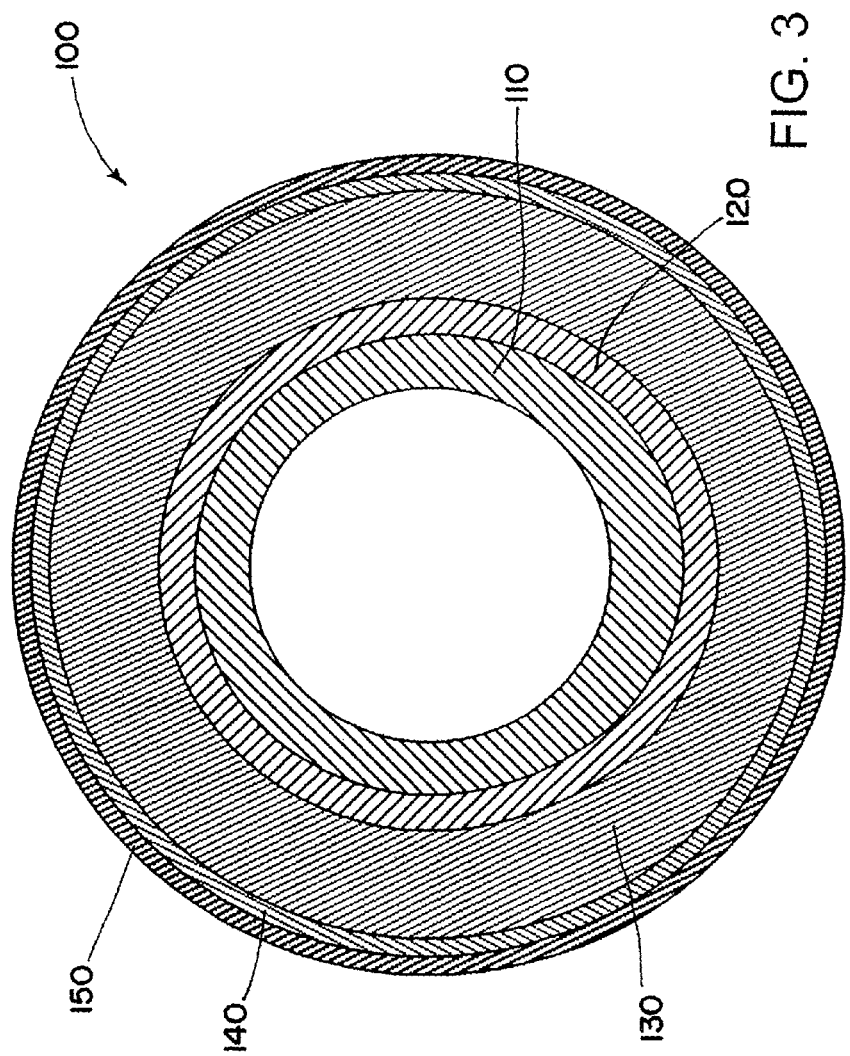
FIG. 3 is a radial cross-sectional view of the assembled hose of FIG. 1 taken along the line 3-3.

Referring now to the drawings, FIGS. 1-3 illustrate a hose 100 comprising a core tube 110, a reinforcement layer 120 surrounding the core tube, an insulating layer 130 surrounding the reinforcement layer, a cover layer 140 surrounding the insulating layer, and a vented jacket 150 surrounding the cover layer. In FIG. 1, the vented jacket 150 is depicted as a wire braid comprising gaps or interstices 154 between adjacent wire strands 151, 152.

Figure 4:
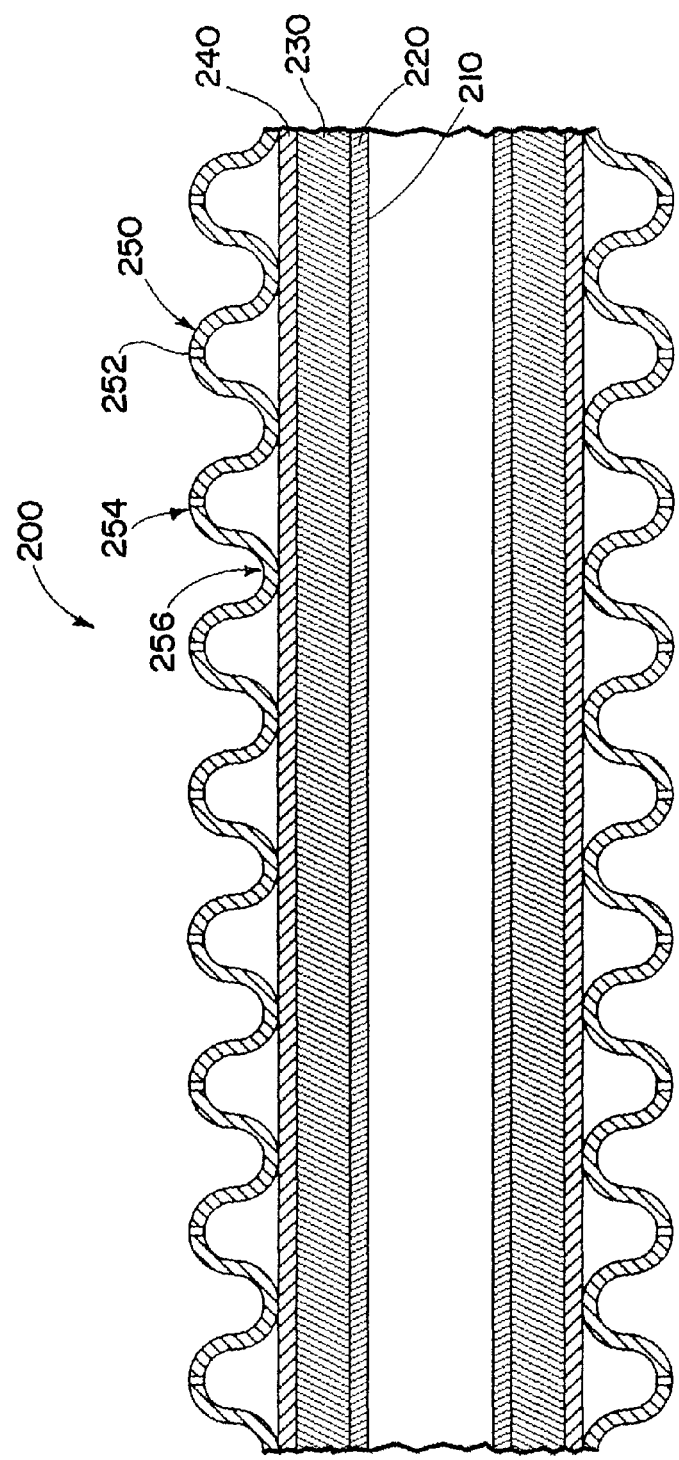
FIG. 4 is a cross-sectional view of a hose, taken along the longitudinal axis, in accordance with one embodiment of the present invention employing a vented jacket comprising a corrugated tube.

FIG. 4 illustrates a hose 200 comprising a core tube 210, a reinforcement layer 220 surrounding the core tube, an insulating layer 230 surrounding the reinforcement layer, a cover layer 240 surrounding the insulating layer, and a vented jacket 250 surrounding the cover layer. In FIG. 4, the vented jacket 250 is a corrugated tube comprising vent holes 252 disposed through a wall of the tube.

The core tube 110, 210 may be formed from any suitable material as desired for a particular purpose or intended use. For example, for hoses used in aircraft, the core tube may be made from a natural rubber, a synthetic rubber compound, a plastic, or other polymeric material. The hose may be provided as extruded, molded, or formed in any suitable manner. Suitable materials, along with copolymers and blends, mixtures, alloys, or other combinations thereof, include polyesters, polyvinyl chlorides, polyimides, polyurethanes, poly(ether ether ketone), polyetherimides, polybutylene and polyethylene terephthalates, polysulfones, polyacrylics, polymethylacrylates, polymethylmethacrylates, polycarbonates, poly(ester and ether urethanes), liquid crystal polymers (LCP), acetal homo and copolymers, polyolefins such as high density or molecular weight polyethylene and polyamides such as Nylon 12, and fluoropolymers, but as may be specifically selected for high or low temperature resistance, surface characteristics such as coefficient of friction, physical or mechanical properties such as flexural modulus, or, in the case of fluid transfer, chemical compatibility with the fluid being handled.

For many aerospace applications or other applications calling for chemical resistance, the core tube may comprise and/or be formed from a fluoropolymer material. Representative fluoropolymers include, but are not limited to, polytetrafluoroethylene (PTFE), fluorinated ethylene polypropylene (FEP) copolymer, perfluoroalkoxy (PFA) resin, polychlorotrifluoroethylene (PCTFE) copolymer, ethylene-chlorotrifluoroethylene (ECTFE) copolymer, ethylene-tetrafluoroethylene (ETFE) terpolymer, polyvinylidene fluoride (PVDF), polyvinylfluoride (PVF), and copolymers and blends and other combination thereof.

As used herein, "chemical resistance" may be understood to mean the ability to resist swelling, crazing, stress cracking, corrosion, and/or otherwise to withstand attack from mild acidic or alkaline solutions, phosphate-ester solutions, alcohols and other organic solvents and hydrocarbons, inorganic solvents (such as water or brine), and the like.

As mentioned, the material forming the core tube 110, 210 may be a homo or copolymer, or a combination thereof such as a blend of one or more homopolymers, one or more copolymers, or one or more homopolymers and one or more copolymers. Such materials each additionally may be admixed with other resins, which may be thermoplastic or thermosetting, such as to form an alloy, blend, mixture, or other combination, or a copolymer thereof.

Alternatively, core tube 110, 210 may be formed of a resin which is a thermoplastic, i.e., melt-processible, synthetic rubber such as a chlorosulfonate, polybutadiene, butyl, neoprene, nitrile, polyisoprene, or buna-N, a copolymer rubber such as ethylene-propylene (EPR), ethylene-propylene-diene monomer (EPDM), nitrile-butadiene (NBR) or styrene-butadiene (SBR), or a blend such as ethylene or propylene-EPDM, EPR, or NBR, or a copolymer or blend of any of the foregoing. The term "synthetic rubbers" also should be understood to encompass materials which alternatively may be classified broadly as thermoplastic elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyesters, ethylene vinyl acetates, and polyvinyl chlorides.

The material forming core tube 110, 210 may be compounded with one or more other fillers, and/or with modifiers or other additives. Such additives, which may be functional or inert, may be provided to be in liquid, powder, particulate, flake, fiber, or other form, and may include other electrically-conductive fillers, microwave-attenuating fillers, thermally-conductive fillers, lubricants such as molybdenum disulfide ($MoS_2$), wetting agents, surfactants, stabilizers, antioxidants, dispersants, pigments, dyes, and other colorants, colorings, or opacifying agents such as for coloring-coding of the tubing, luminescents, light reflectants, anti-static agents, coupling agents such as titanates, chain extending oils, tackifiers, flow modifiers, blowing agents, foaming or anti-foaming agents, reinforcements such as glass, carbon, or textile fibers, silanes, peroxides, film-reinforcing polymers and other agents, emulsifiers, thickeners, and/or flame retardants and other fillers such as aluminum trihydrate, antimony trioxide, metal oxides and salts, intercalated graphite particles, phosphate esters, decabromodiphenyl oxide, borates, siloxanes, phosphates, halogenated compounds, glass, silica, which may be fumed or crystalline, silicates, mica, ceramics, and glass or polymeric microspheres. Typically, the additives are blended or otherwise admixed with the base material, and may comprise between about 0.05% and 80% or more by total volume of the formulation.

For many aerospace application, including those involving fuel transfer, it may be desirable for the core tube 110, 210 to be electrically-conductive to provide static dissipation and/or electrical grounding. The resin forming the tube 110, 210 thus may be filled with a carbon black or other electrically-conductive filler. As admixed with the black, the resin generally may form a binder into which the black filler may be dispersed. The black filler generally may included within the resin in a proportion sufficient to provide the level of electrical conductivity which is desired for the intended application. For many applications, a conductivity of 12 [mu]A@1000 VDC for the core tube 110, 210 will be specified as in accordance with SAE Standard AS2078. In one embodiment, the core tube is made from a polytetrafluoroethylene (PTFE) material, such as Teflon®. The size and dimensions of the core tube, including the inner and outer diameter of the core tube, may be selected as desired for a particular purpose or intended use.

While FIGS. 1-4 show a base hose construction comprising a core tube with a surrounding reinforcement layer (layers 120, 220), it will be appreciated that a reinforcement layer is optional depending on the particular application or design goals, and a hose in accordance with the invention may or may not be reinforced. Materials suitable as a reinforcement layer are known in the art, and the material(s) used as a reinforcement layer may be selected as desired for a particular purpose or intended use. Additionally, the thickness and/or number of reinforcement layers may be selected based on the desired mechanical properties, including a desired level of flexibility.

The reinforcement layer(s) 120, 220 may be provided, for example, as knitted, braided, woven, spiral, i.e., helically, or otherwise wound, and/or wrapped or otherwise formed to surround the core tube 120, 220. Each of the reinforcement layers 120, 220 may be formed of one or more filaments, which may be monofilaments, continuous multi-filament, i.e., yarn, stranded, cord, roving, thread, braid, tape, or ply, or short "staple" strands, of one or more fiber materials. The fiber material, which may be the same or different in each of the reinforcement layers which are provided, and which may be a blend, alloy, or other combination of two or more different materials in each layer, may be a natural or synthetic polymeric material such as a nylon, cotton, polyester, polyamide, aramid, polyolefin, polyvinyl alcohol (PVA), polyvinyl acetate, or polyphenylene bezobisoxazole (PBO), or blend or other combination thereof, or, particularly, a metal wire such as a steel, which may be galvanized or stainless or otherwise corrosion resistant (CRES), aluminum, nickel, copper, brass, or zinc or zinc-plated, or a blend, alloy, or other combination thereof.

The reinforcement layer(s) may be formed from a metal wire. Suitable metal wires include, for example, those made from carbon steel, copper, stainless steel, brass plated steel or the like. A particularly suitable metal for the reinforcement layer is stainless steel. The reinforcement layer 120 in FIG. 1 is shown as a braid of alternating interwoven wires 121, 122. The configuration of the braid is not limited and may be selected as desired. For example, the braid may be a one over, one under configuration (as shown in FIG. 1), a two over, two under configuration, or any other configuration. Additionally, the size of the gaps (e.g., gaps 124) between adjacent wires is not limited. It will be appreciated that a metal wire reinforcement layer need not be in a braid but may be spirally wound or otherwise laid over the core tube.

The hose assembly 100, 200 includes at least one thermal insulation layer 130, 230, which is provided to surround the core tube 110, 210 for thermally insulating or otherwise protecting the core tube 110, 210 in the event of a fire situation, and thereby assisting in maintaining the core tube 110, 210 at temperature below the combustion temperature thereof. The thermal insulation layer 130, 230 may be formed from one or more layers of a suitable material, which may be provided in the form of a tape or other film which may be spiral, i.e., helically, wrapped in an overlapping manner over the outer surface of the core tube 110, 210 or over any intermediate layers which may be interposed therebetween. The thermal insulation layer alternatively may be longitudinally, i.e., "cigarette," wrapped over the core tube 110, 210, or crosshead, co-extruded, or otherwise conventionally extruded over the core.

For example, depending on the diametric extent of the tube 110, 210, the tape or other form of the insulation layer or layers 130, 230 each may have a thickness of between about 5-10 mils (0.127-0.254 mm). However, as the degree of fire resistance provided in the hose 100, 200 by the one or more layers 130, 230 will be generally proportional to the thicknesses of those layers, it should be understood that thicker layers or multiple thinner layers can be provided in the construction to increase the fire resistance thereof. Indeed, flame resistance performances (such as per SAE Standard AS1055) of 15 minutes or longer may be achieved using a thicker insulation layer 130, 230, which may be either one or more thicker layers or a combination of two or more thinner layers which may be used to achieve a specified overall thickness. If the insulating layer is provided in the form of a tape, such tape may be between about 0.5-2.0 inch (1.3-5.0 cm) wide.

The insulating layers 130, 230 may be any suitable material for providing thermal insulation to the underlying hose structure, i.e., the core tube or the core tube in combination with one or more reinforcing layers. In one embodiment, the insulating layer may be a silicone material. Suitable thermoplastic materials generally will include those materials classified as "engineering" thermoplastics, and particularly those materials, which may be homopolymers or copolymers, and which also may be blends, alloys, mixtures, or other combinations of two or more different materials, which may be further classified as "high temperature" materials as having a melting point of at least about 300° C. Representative materials include, particularly, polyimides such as those marketed under the name Kapton® (E.I. DuPont de Nemours and Co., Wilmington, Del., USA). Other suitable thermoplastic materials in addition to polyimides include polysulfones, polyetheretherketones, copolymers of two or more thereof, and combinations of two or more thereof. In one embodiment, the insulating layer may be a fibrous material comprising a material chosen from silica fibers, fiberglass, ceramic fibers, and the like. The fibrous material may be provided as a strip or tape that is wound about the core tube (or, if applicable, wound about a reinforcement layer overlying the core tube). Where multiple insulating layers are employed, the layers may be formed from the same or different materials. When the insulating layer comprises two or more layers, the layers may be the same or different in terms of thickness and/or the materials used in the respective layers. Non-limiting examples of material suitable for the insulating layer include a silica fiber tape available from Insulflex AB or fiberglass yarn available from AGY. The insulating layer may be unfilled or, alternatively, filed with one or more fillers or additives.

The thickness of the insulating layer(s) may be selected as desired to provide a desired level of thermal insulation to the underlying core tube. That is, the thickness may be selected such that the temperature of the core tube's outer surface does not exceed a desired threshold limit over a given period of time. In one embodiment, the insulating layer has a thickness that is about 30 to about 70% of the overall radius of the hose assembly. In one embodiment, the insulating layer may have a thickness in the radial dimension of from about 0.1 to about 0.3 inches. The number of insulating layers may be selected as desired to provide a particular level of thermal insulation as well as maintain other desirable properties for the hose including, for example, a desired level of flexibility.

The hose assembly 100, 200 includes a cover layer 140, 240 surrounding the insulating layer. The cover layer may also be referred to herein as a chemical resistant layer. As used herein, "chemical resistance" refers to the ability to resist swelling, crazing, stress cracking, corrosion, and/or otherwise to withstand attack from mild acidic or alkaline solutions, phosphate-ester solutions, alcohols and other organic solvents and hydrocarbons, inorganic solvents (such as water or brine), and the like. The chemical resistant layer may function as a barrier to liquid, chemical, and/or particulate matter. The chemical resistant layer 140, 240 may also provide some degree of abrasion resistance to the hose.

In accordance with aspects of the present invention, the chemical resistant layer comprises a metal layer. In one aspect, a chemical resistant layer comprising a metal layer may be formed from or by the metal layer itself. Suitable metals for use in the metal layer include, but are not limited to, aluminum, stainless steel, nickel, iron, combinations of two or more thereof (including alloys), or the like. The chemical resistant layer may be provided as a metal layer in the form of a metal foil wrapped or otherwise disposed about the insulating layer. The metal layer may also be provided as a film layer deposited (e.g., such as by evaporating the metal) directly onto the insulating layer or onto another metal layer. In one embodiment, the chemical resistant layer is a metalized coating deposited over the insulating layer. Metalized insulating material is available, for example, from ADL Insulflex, Inc.

The chemical resistant layer may have any desired thickness. In one embodiment, the chemical resistant layer has a thickness of from about 0.002 to about 0.03 inches.

While not wishing to be bound by any particular theory, in addition to contributing to or providing the desired cover layer/chemical resistant layer properties, the metal layer may also contribute to the heat resistance of the hose. For example, the metal layer may have the effect of reflecting incoming radiation, such that the metal layer functions as a radiation protection layer that protects the underlying construction.

The core tube 110, 210, reinforcement layer(s) 120, 220, insulating layer(s) 130, 230, and chemical resistant layer(s) 140, 240 are contained within the vented jacket 150, 250. The vented jacket may provide abrasion, scuff, and/or impact resistance and protects the underlying hose structure. The vented jacket should be dimensioned so as to allow the hose to have a desired level of flexibility. The vented jacket comprises one or more vent holes such as, for example, gaps or interstices 154 in wire braid 150 as shown in FIG. 1, or vent holes or apertures 252 in corrugated tube 250 as shown in FIG. 4. The vent holes may prevent air from being trapped underneath the outer jacket and/or the cover layer, which may cause the cover layer to balloon or swell and even break.

In the embodiment shown in FIG. 1, the vented jacket 150 comprises a wire braid having alternately interwoven wires 151, 152 wound in opposite directions in an over and under pattern. Even though the braid may be relatively tight, small gaps or interstices 154 will occur at the intersection of adjacent wires. The wire braid may have any configuration as desired including, for example, a one over, one under configuration (as shown in FIG. 1), a two over, two under configuration, or the like. The size of gaps or interstices 154 is not limited and may be selected for a particular purpose or intended use.

As shown in FIG. 4, a vented jacket 250 formed from a corrugated tube comprises vent holes 252 disposed in a wall of the tube. The configuration of the corrugated tube is not limited and may be selected as desired. For example, corrugated tube 250 is shown as having rounded peaks 254 and rounded valleys 256. The peaks and valleys may be shaped as desired and may have, for example, square peaks and square valleys, rounded peaks and square valleys, square peaks and rounded valleys, combinations thereof, or other shapes as desired. The distance or spacing between adjacent peaks is also not limited. The number and location of vent holes may also be selected as desired. As shown in FIG. 4, vent holes 252 are located near the apex of peaks 254. The vent holes, however, may be located in any portion of the wall of the corrugated tube.

The vented jacket 150, 250 may be made of a corrosion resistant material such as, for example, a stainless steel or a nickel alloy. The vented jacket may be made from temperature stabilized materials depending on the anticipated ambient temperatures for the particular application. The corrosion resistant material should be able to withstand temperatures of about 450° F. or higher. In one embodiment, the corrosion resistant material should be able to withstand temperatures of about 600° F. or higher, and, in another embodiment, up to at least about 860° F. Unstabilized stainless steels may form chromium carbides at elevated temperatures, which cause the material to weaken or corrode. In one embodiment, the vented jacket comprises a material that is resistant to chromium carbide formation when the ambient temperature around the jacket is about 600° F. or higher. Other suitable corrosion resistant materials include, but are not limited to, nickel-based alloys such as those sold under the tradename Inconel®. The vented jacket may also be formed from corrosion resistant (CRES) stainless steels including, but not limited to, type 304, type 321, and type 347 stainless steels depending on the ambient temperature levels predicted for the application. Type 321 and type 347 are stabilized stainless steels and are suitable for high temperature applications and may be resistant to chromium carbide formation at temperatures of about 800° F. or higher. In one embodiment, the vented jacket comprises a wire braid formed from a type 321 stainless steel, a type 347 stainless steel, or combinations thereof, and is resistant to chromium carbide formation at temperatures of at least about 860° F.

The insulating layer, chemical resistant layer having a metal layer, and vented jacket may collectively be considered as a fireguard or firesleeve for the hose.

The hose 100, 200 may be made by forming a core tube 110, 210 such as by extrusion, applying an insulating layer 130, 230 around the core tube, applying a chemical resistant layer 140, 240 around the insulating layer, and applying a vented jacket 150, 250 around the cover layer. The insulating layer may be applied by, for example, wrapping a strip or tape of fibrous material around the core tube (or optionally a reinforcement layer overlying the core tube). Depending on the material used as the insulating layer, the insulating layer may also be extruded over the core tube or an optional reinforcement layer. The cover layer may be formed by extrusion. The vented jacket may be applied by braiding over the layers or slipping a pre-braided or a corrugated vented tube over the layers.

It will be appreciated that the hose 100, 200 may have a fitting attached to each end for making appropriate connections as desired for a particular purpose or intended use. In FIG. 2, for example, the assembled hose 100 of FIG. 1 is shown as having a hose fitting 160, including a nipple 162 positioned within the core tube 110, and a socket 164, and a sleeve 166 crimped on an outer end of the hose 100.

When using the hose 100, 200 with a fitting 160, which may typically be made of steel, the fitting 160 provides a conductive path for the heat around the fire sleeve to the interface of the fitting 160 and the hose 110, which is typically made of PTFE. A fire produces a great amount of thermal energy that can subject the materials contacting the fitting 160 to material damage. In FIG. 2, a thermal coating 170 is shown applied to the exterior surface of the nipple 162. This protects the interior of the core tube 110 and accordingly extends the life of the hose 100 in a fire environment. An example of a suitable high-temperature protective coating is CP 4010 provided by Aremco Products, Inc. of Valley Cottage, N.Y. under the trademark Corr-Paint. This protective coating is a silicone-based, heat resistant coating that is VOC-compliant, water dispersible silicone resin. This coating provides adherence to metals and provides thermal resistance to temperatures to 1100° F. when applied at a wet film thickness of five mils or a corresponding dry film thickness of 1.5 mils. Other thermal coatings may also be appropriate.

In applying the thermal coating to a fitting such as a nipple 162, the nipple outside surfaces should be free of oil, grease, dirt, corrosives, oxides, pains or other foreign matter. The front end (conical sealing surface) of the nipple 162 is masked. The thermal coating 170 is applied using a spray paint gun. The coating 170 is typically applied at a wet film thickness of five mils. The coating 170 is then allowed to dry and then is cured at an elevated temperature for a set time. It is further noted that in addition to providing a thermal resistant benefit, testing using thermal coated nipples 162 with hose 100 in qualification testing of hose assemblies has shown that the thermal coatings do not adversely affect the fitting or hose assembly in stress degradation testing, proof testing, or electrical conductivity testing.

The nipple 162 may have a thermal coating 170 disposed on at least a portion of the outside diameter of the nipple 162. The thermal coating may retard conduction of heat through the metal parts and underlying nipple into the core tube, thereby protecting the interior of the core tube, which may further extend the life of the hose in a fire environment.

The thermal coating employed and thickness of such coating may be selected as desired for a particular application and/or a desired time to failure specification. Examples of suitable thermal coatings include CP 40XX e.g., CP 4000, CP 4010, etc.), or CP 30XX (e.g., CP 3000) coating available from Aremco Products, Inc. of Valley Cottage, N.Y. under the trademark Corr-Paint. The CP 40XX coatings are identified as silicone-based, heat resistant coatings that are formulated with VOC-compliant, coater-dispersible silicone resin. The coatings provide adherence to metals and provide thermal resistance to temperatures to 1100° F. The CP 30XX coatings are inorganic-ceramic, aqueous-based coatings that provide thermal resistance to 1200° F. to 1500° F.

In embodiments in which the core tube is provided as an electrically conductive core tube, the nipple should also provide an electrical path for the conductive core tube to bleed-off static-dissipation and/or for electrical grounding. In such embodiments further comprising a thermal coating, the coating should be applied to promote electrical conductivity from the conductive core tube to the fitting. In this sense, at least a portion of the nipple that is adjacent the core tube should be substantially free of any thermal coating.

It will be appreciated that the coating on the nipple is optional depending on the application or conditions under which the hose will be used.

A hose in accordance with the present invention may be fire resistant and/or fireproof as defined by SAE AS1055 for the particular hose material. AS1055 classifies fire protection as fire resistant (Class A) where the hose withstands the designated fire test for 5 minutes without evidence of leakage, and as fireproof (Class B) where the hose withstands the designated fire test for 15 minutes without evidence of leakage. Fire protection is also classified based on the composition of the core tube (e.g., whether the core tube is rubber based or Teflon (PTFE) based), hose function (e.g., fuel and lube oil or hydraulic fluid), and compatibility (e.g., synthetic fluid or petroleum based fluid). The flow conditions under which a hose may be considered fire resistant or fireproof may be selected as desired for a particular purpose or intended use. For example, the amount of flow within the hose may affect the ability of a hose to withstand the flame in a fire test for a given period. Engines and other environments in which the hose may be used are being designed so that the fluid flow through the hose may be stopped during a fire. Thus, in one embodiment it may be desirable for the hose to be fire resistant or fireproof under zero flow conditions.

A hose suitable for use in high temperature conditions has been described with reference to the foregoing description, figures, embodiments, and examples. It is appreciated that modifications may occur to persons skilled in the art upon reading and understanding the specification and annex drawings. It is intended that the inventive subject matter be considered as including all such modifications insofar as they come within the scope of the appended claims or equivalents thereof.

The invention claimed is:

1. A flexible hose assembly comprising:
   a core tube;
   a thermally insulating layer surrounding the core tube;
   a chemical resistant layer surrounding the insulating layer, the chemical resistant layer comprising a metal layer; and
   a vented jacket surrounding the chemical resistant layer.

2. The hose assembly of claim 1, wherein the metal layer is a metal foil.

3. The hose assembly of claim 1, wherein the metal layer is a metal film deposited on the insulating layer.

4. The hose assembly of claim 1, wherein the metal layer comprises aluminum, stainless steel, nickel, iron, or a combination of two or more thereof.

5. The hose assembly of claim 1, wherein the insulating layer comprises a material chosen from a silica fiber, a fiberglass, a ceramic fiber, or a combination of two or more thereof.

6. The hose assembly of claim 1, wherein the vented jacket comprises a corrosion resistant material chosen from a stainless steel, a nickel alloy, or combinations thereof.

7. The hose assembly of claim 6, wherein the vented jacket comprises a CRES or nickel alloy wire braid having interstices therein.

8. The hose assembly of claim 7, wherein the wire braid is formed from a type 321 stainless steel, a type 347 stainless steel, or combinations thereof.

9. The hose assembly of claim 6, wherein the vented jacket comprises a corrugated tube comprising at least one vent hole disposed through a wall thereof.

10. The hose assembly of claim 1, further comprising a fitting and a sleeve attached to each end of the hose.

11. The hose assembly of claim 10, wherein an exterior surface of a nipple portion of the fitting is coated.

12. The hose assembly of claim 1, wherein the insulating layer is non-ablative when the hose is subjected to a fire at 2000° F. for a period of fifteen minutes.

* * * * *